(12) United States Patent
Spindler

(10) Patent No.: US 9,821,585 B2
(45) Date of Patent: Nov. 21, 2017

(54) LASER-MARKED POLYMER WORKPIECE

(71) Applicant: SAINT-GOBAIN GLASS FRANCE, Courbevoie (FR)

(72) Inventor: Oliver Spindler, Auenwald (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 630 days.

(21) Appl. No.: 14/351,437

(22) PCT Filed: Oct. 10, 2012

(86) PCT No.: PCT/EP2012/069994
§ 371 (c)(1),
(2) Date: Apr. 11, 2014

(87) PCT Pub. No.: WO2013/072142
PCT Pub. Date: May 23, 2013

(65) Prior Publication Data
US 2014/0248476 A1  Sep. 4, 2014

(30) Foreign Application Priority Data

Nov. 17, 2011  (EP) .................................... 11189471

(51) Int. Cl.
*B41M 5/26* (2006.01)
*B29C 45/14* (2006.01)
*B60J 1/00* (2006.01)

(52) U.S. Cl.
CPC ............. *B41M 5/267* (2013.01); *B29C 45/14* (2013.01); *B60J 1/00* (2013.01); *Y10T 428/24802* (2015.01); *Y10T 428/24868* (2015.01); *Y10T 428/24901* (2015.01)

(58) Field of Classification Search
CPC ............................... B41M 5/267; B29C 45/16
See application file for complete search history.

(56) References Cited

U.S. PATENT DOCUMENTS

| | | | | |
|---|---|---|---|---|
| 4,822,973 A | * | 4/1989 | Fahner | B41M 5/267 219/121.6 |
| 5,977,514 A | * | 11/1999 | Feng | B41M 5/267 219/121.69 |
| 7,980,596 B2 | * | 7/2011 | Labrec | B41M 5/24 156/242 |

FOREIGN PATENT DOCUMENTS

| | | |
|---|---|---|
| CN | 101142089 A | 3/2008 |
| DE | 19732306 | 1/1999 |
| DE | 19944372 | 3/2001 |
| DE | 102009028937 | 3/2011 |

(Continued)

OTHER PUBLICATIONS

International Search Report dated Jan. 25, 2013 for PCT/EP2012/069994 filed on Oct. 10 , 2012.

(Continued)

*Primary Examiner* — Benjamin A Schiffman
(74) *Attorney, Agent, or Firm* — Steinfl + Bruno LLP

(57) ABSTRACT

A laser-marked polymer workpiece is described. The workpiece has a transparent component and an opaque component applied to at least one region of the transparent component. A mark is introduced onto a surface of the opaque component facing the transparent component with at least one laser. The mark is introduced, via a laser, through the transparent component. The mark is a lightening of the surface of the opaque component on which the mark was introduced.

12 Claims, 3 Drawing Sheets

(56) References Cited

FOREIGN PATENT DOCUMENTS

Figure 1:
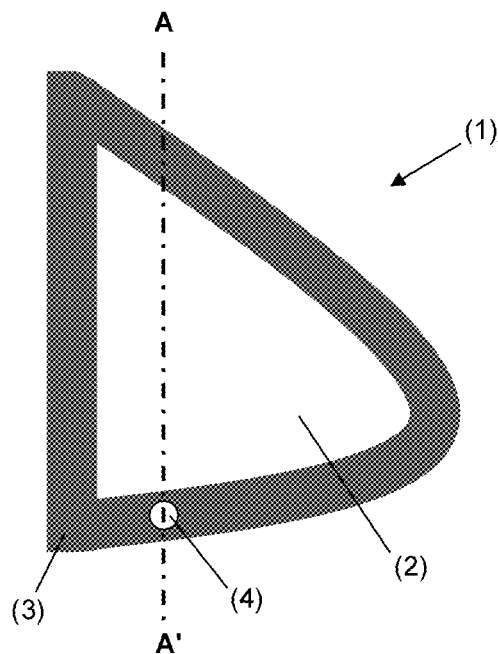

| | | |
|---|---|---|
| JP | 3107982 B2 | 11/2000 |
| JP | 2002532379 A | 10/2002 |
| WO | 2006037973 | 4/2006 |
| WO | 2006101063 A1 | 9/2006 |
| WO | WO 2010011227 A1 * | 1/2010 ............ G06K 1/126 |
| WO | 2010019194 | 2/2010 |
| WO | 2010023102 | 3/2010 |
| WO | 2010054077 | 5/2010 |

OTHER PUBLICATIONS

Written Opinion for International Application No. PCT/EP2012/069994 filed Oct. 10, 2012 on behalf of Saint-Gobain Glass France. dated Jan. 25, 2013. 13 pages. German original+English Translation.

* cited by examiner

LASER-MARKED POLYMER WORKPIECE

CROSS REFERENCE TO RELATED APPLICATIONS

The present application is the US national stage of International Patent Application PCT/EP2012/069994 filed on Oct. 10, 2012 which, in turn, claims priority to European Patent Application EP 11189471.3 filed on Nov. 17, 2011.

The invention relates to a laser-marked polymer workpiece, a method for its production, and its use.

Plastic panes for motor vehicles are typically produced in the multi-component injection molding method. Customarily, a darkly colored, usually black, opaque component is applied to a transparent component in the edge region of such a pane. In the region of the opaque component, the pane can be bonded, for example, glued, to the motor vehicle body in a manner not visible to the observer.

By means of a mark or inscription, for example, a manufacturer's code, approval mark, a production date, or optical effects can be applied to the pane. Different methods are known for marking plastic panes. With injection molding of the pane, the mark can be introduced as a negative or positive relief in the surface of the pane. However, image sharpness, contrast, minimum font size, and level of detail are limited. In addition, because of the relief, marginal coating distribution problems can occur at the time of lacquer coating of the pane.

Alternatively, a mark can be engraved or milled into the pane as a relief after injection molding. Here, as well, at the time of lacquer coating of the pane after marking, coating distribution problems can occur. Application of the relief after lacquer coating of the pane damages the lacquer layer.

Methods for laser marking of plastic panes are also known. In that case, the marking is based on a darkening of a region of the surface of the pane as a result of laser irradiation. Here, the mark is also not protected against mechanical and chemical damage as well as UV radiation. With lacquer coating of the pane after laser marking, coating distribution problems can occur. Application of the mark after lacquer coating of the pane damages the lacquer layer. The darkening can be produced by other known methods even in the interior of a plastic pane. Since the darkened mark is not discernible against the background of the opaque component in the edge region of the pane, the mark must be applied in the transparent visual field of the pane, where it can have a disturbing effect.

Methods, with which a laser mark can be introduced into polymer workpieces in the form of a darkening, are, for example, known from DE19944372A1, WO2010019194A1, DE19732306A1, and WO2010054077A2.

Also known are methods of laser marking in which laser sensitive materials specially introduced into the workpiece are used, for example, from DE102009028937A1 and WO2010023102A1. However, the production of the workpieces is rendered more difficult by the necessity of the laser sensitive materials.

The object of the present invention is to make available a marked polymer workpiece as well as a method for its production, wherein the disadvantages of the prior art are avoided.

The object of the present invention is accomplished according to the invention by a laser-marked polymer workpiece according to the independent claim 1. Preferred embodiments emerge from the dependent claims.

The laser-marked polymer workpiece according to the invention comprises at least the following characteristics:
a transparent component and
an opaque component applied to at least one region of the transparent component,
wherein a mark is introduced with at least one laser through the transparent component into the surface of the opaque component facing the transparent component.

The advantage of the laser-marked polymer workpiece resides in the positioning of the mark in the interior of the polymer workpiece. Thus, the mark is protected against mechanical and chemical damages and other environmental influences. In addition, the mark does not result in coating distribution problems when the polymer workpiece is covered by a coating after marking. In addition, the mark is arranged in the region of the opaque component of the polymer workpiece. If the polymer workpiece according to the invention is, for example, the pane of a motor vehicle, the transparent visual field is not negatively impacted by the mark.

The object of the present invention is further accomplished according to the invention by a method for producing a laser-marked polymer workpiece, wherein:
a) a transparent component and an opaque component are bonded by multi-component injection molding to form a polymer workpiece,
b) the opaque component is irradiated through the transparent component with at least one laser and a mark is thereby introduced into the opaque component.

The opaque component contains a colorant. The mark is a local brightening of the opaque component.

The dimensions of the polymer workpiece can vary widely and thus be ideally adapted to the requirements of the individual case. The area of the polymer workpiece can, for example, be from 1 $cm^2$ to 3 $m^2$. Preferably, the polymer workpiece has an area from 100 $cm^2$ to 2.5 $m^2$, as is customary for panes of motor vehicles and in the construction and architectural sector.

The polymer workpiece comprises, according to the invention, at least a transparent component and an opaque component, wherein the opaque component is arranged at least on one region of the transparent component. The polymer workpiece is preferably produced by multi-component injection molding, wherein, first, the transparent component is injection molded and, then, the opaque component is applied to at least a region of the transparent component. Of course, in principle, the opaque component can be injection molded first, followed by the transparent component. The polymer workpiece is, for example, a motor vehicle pane that contains a transparent polymer component, wherein an opaque polymer component is arranged circumferentially in the edge region on the transparent polymer component. The width of the opaque component is, for example, from 1 cm to 10 cm. The opaque component thus forms a frame.

The polymer workpiece is preferably flat or slightly or highly curved in one or a plurality of spatial directions.

The transparent component of the polymer workpiece preferably contains at least polyethylene (PE), polycarbonates (PC), polypropylene (PP), polystyrene, polybutadiene, polynitriles, polyesters, polyurethanes, polymethyl methacrylates (PMMA), polyacrylates, polyesters, polyamides, polyethylene terephthalate, acrylonitrile butadiene styrene (ABS), styrene acrylonitrile (SAN), acrylonitrile styrene acrylester (ASA), acrylonitrile butadiene styrene-polycarbonate (ABS/PC), and/or copolymers or mixtures thereof.

The transparent component of the polymer workpiece particularly preferably contains polycarbonates (PC) and/or polymethyl methacrylate (PMMA). This is particularly advantageous with regard to the transparency, processing, strength, weather resistance, and chemical resistance of the polymer workpiece.

In the context of the invention, "transparent" means that an observer can see through the component and can recognize objects that are behind the component as viewed by the observer. The transparent component can be colorless. The transparent component can also be colored or tinted. The transmission of the transparent component in the visible spectral range is, for example, greater than or equal to 50% or even greater than or equal to 70%.

In the context of the invention, "opaque" means that an observer cannot see through the component. The transmission of the opaque component in the visible spectral range is thus clearly reduced and is, for example, less than or equal to 20%, less than or equal to 10%, less than or equal to 5%, in particular roughly 0%.

The transparent component preferably has a layer thickness from 1 mm to 20 mm, particularly preferably from 3 mm to 10 mm.

The opaque component of the polymer workpiece preferably contains at least polyethylene (PE), polycarbonates (PC), polypropylene (PP), polystyrene, polybutadiene, polynitriles, polyesters, polyurethanes, polymethyl methacrylates, polyacrylates, polyesters, polyamides, polyethylene terephthalate, acrylonitrile butadiene styrene (ABS), styrene acrylonitrile (SAN), acrylonitrile styrene acrylester (ASA), acrylonitrile butadiene styrene-polycarbonate (ABS/PC), and/or copolymers or mixtures thereof, particularly preferably polycarbonates (PC), polyethylene terephthalate (PET), and/or polymethyl methacrylate (PMMA).

The opaque component of the polymer workpiece further contains at least one colorant. The opacity of the component is obtained by means of the colorant. The colorant can contain inorganic and/or organic dyes and/or pigments. The colorant can be colourful or not colourful. Suitable colorants are known to the person skilled in the art and can, for example, be looked up in the *Colour Index of the British Society of Dyers and Colourists* and the *American Association of Textile Chemists and Colorists*. Preferably, a black pigment is used as the colorant, for example, carbon black, aniline black, bone black, iron oxide black, spinel black, and/or graphite. Thus, a black opaque component is obtained.

The opaque component preferably has a layer thickness from 0.5 mm to 10 mm, particularly preferably from 1 mm to 7 mm.

The mark is applied according to the invention by a laser. The beam of the laser enters the polymer workpiece via the surface of the transparent component facing away from the opaque component. The beam of the laser is focused in an advantageous embodiment by an optical element, for example, a lens or an objective, on the boundary surface between the transparent component and the opaque component. The focal length of the focusing optical element is preferably from 10 mm to 300 mm. Particularly good results are thus obtained. A smaller focal length of the optical element requires too short a distance between the polymer workpiece and the optical element during the marking operation. A larger focal length results in too great an expansion of the laser focus, by means of which the resolution of the marking process and the power density in the focus are limited.

The beam of the laser can be guided between laser and the focusing optical element by at least one optical waveguide, for example, a glass fiber. Other optical elements can also be arranged in the beam path of the laser.

In an advantageous embodiment, the mark is introduced by a movement of the beam of the laser into the surface of the opaque component facing the transparent component. It has been demonstrated that the beam of the laser results in a brightening of the opaque component in the region of the boundary surface between the transparent component and the opaque component. The brightening is clearly discernible through the transparent component as a mark. The mark preferably appears as at least a uniformly bright region on the opaque component.

For the laser marking of the polymer workpiece according to the invention, it is, of course, necessary for the transparent component to permit passage of laser light, i.e., for at least part of the beam of the laser to be transmitted through the transparent component. The fraction of the beam of the laser transmitted through the transparent component is, for example, greater than or equal to 50%, preferably greater than or equal to 70%, particularly preferably greater than or equal to 80%, and most particularly preferably than or equal to 90%.

The mark can have any configuration, for example, a two-dimensional geometric figure, a pictogram, a company or trademark symbol, an inscription in the form of letters and/or numbers, or combinations thereof. By means of the marking, the polymer workpiece can be provided with a manufacturer's code, an approval mark, a production date, or optical effects.

The movement of the beam of the laser is preferably done by at least one mirror that is connected to a movable part. By means of the movable part, the mirror can be adjusted in two directions, preferably two directions orthogonal to each other, particularly preferably horizontally and vertically. The movement of the beam of the laser can also be done by a plurality of mirrors connected in each case to a movable part. For example, the movement of the beam of the laser can be done by two mirrors, where one mirror can be adjusted horizontally and the other mirror vertically. During laser marking, the polymer workpiece is preferably fixed in a part holder.

Alternatively, the beam of the laser can be stationary and the polymer workpiece can be moved during the marking operation.

The beam of the laser is preferably moved at a speed of 200 mm/s to 5000 mm/s over the boundary surface between the transparent component and the opaque component. Particularly good results are thus obtained.

A solid-state laser, for example, an Nd:YAG laser, an Nd:Cr:YAG laser, an Nd:Ce:YAG laser or a Yb:YAG laser, is preferably used as the laser. Particularly preferably, a fiber laser is used with, for example, a ytterbium-doped glass fiber as the active medium. This is particularly advantageous with regard to the beam quality of the laser beam. The emission wavelength of the laser is preferably from 600 nm to 3000 nm, particularly preferably from 900 nm to 1500 nm, for example, roughly 1064 nm. Particularly good results are thus obtained.

However, a different type of laser can also be used according to the invention, for example, a gas laser, such as a $CO_2$ laser.

The laser can be used in continuous wave operation. Preferably, the laser is operated in pulsed mode. This is particularly advantageous with regard to high power density in the polymer substrate. The pulse frequency is preferably from 1 kHz to 500 kHz, particularly preferably from 20 kHz to 150 kHz. the pulse duration is preferably from 5 ns to 300 ns, particularly preferably from 50 ns to 150 ns. This is particularly advantageous with regard to the power density of the laser during the laser marking.

The output power of the beam of the laser is preferably from 1 W to 50 W, particularly preferably from 15 W to 35 W. This is particularly advantageous regard to an efficient marking of the polymer substrate.

In an advantageous embodiment of the invention, a protective coating is applied to the polymer workpiece. Preferably, thermal curing or UV curing coating systems based on polysiloxanes, polyacrylates, polymethacrylates, and/or polyurethanes are used. The protective coating preferably has a layer thickness from 1 μm to 50 μm, particularly preferably from 2 μm to 25 μm. The particular advantage resides in scratch resistance and weather resistance as well as chemical resistance of the polymer workpiece due to the protective coating.

The protective coating can also contain coloring compounds and pigments, UV blockers, preservatives, as well as components for increasing scratch resistance, for example, nanoparticles.

The protective coating can, for example, be applied to the polymer workpiece by a dipping, flooding, or spraying method. The protective coating is cured after application preferably by temperature and/or UV light. In the case of production of the polymer workpiece by injection molding, the protective coating can also be applied by an in-mold coating method.

Suitable protective coating products are, for example, AS4000, AS4700, variants of PHC587 or UVHC300, which are produced by the company Momentive.

The protective coating can also comprise a plurality of layers, preferably an adhesion promoting layer on the polymer workpiece and a lacquer coating on the adhesion promoting layer. The adhesion promoting layer can contain, for example, acrylates and have a layer thickness from 0.4 μm to 5 μm. The lacquer coating can contain, for example, polysiloxanes and have a layer thickness from 1 μm to 15 μm. The adhesion promoting layer is preferably dried after application, before the lacquer coating is applied.

The protective coating is preferably applied after the laser marking of the polymer workpiece according to the invention. The mark is arranged in the interior of the polymer workpiece such that during the application of the protective coating after the laser marking, no coating distribution problems or other disadvantageous impairments of the protective coating and/or the mark occur.

The laser-marked polymer workpiece is preferably used as a pane or part of a pane of means of transportation for travel on land, in the air, or on water, in particular as a rear window pane, windshield, side pane, and/or roof pane of motor vehicles. The laser-marked polymer workpiece can be used as a window pane, but also as an interior part, for example, as a switch or sensing device.

Figure 2:
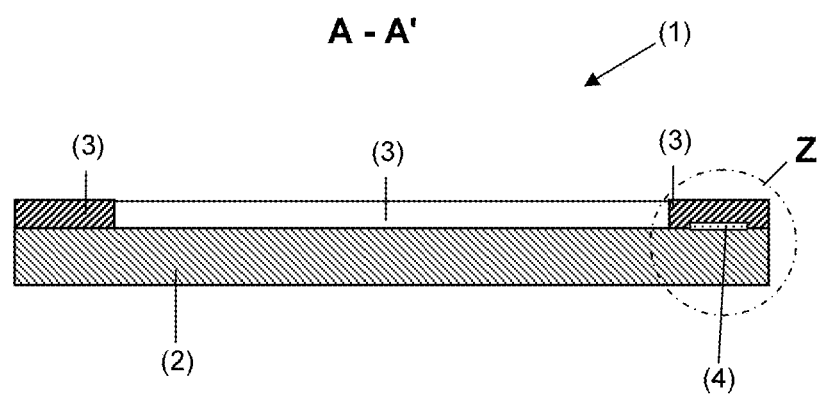
Figure 2A:
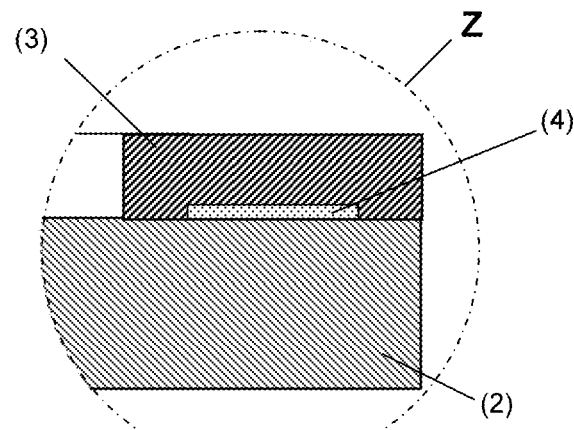
Figure 3:
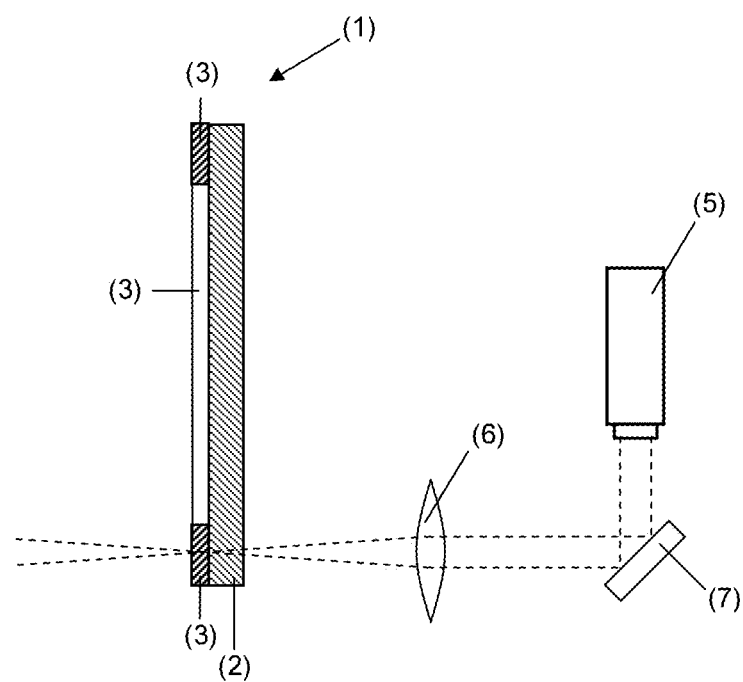
Figure 4:
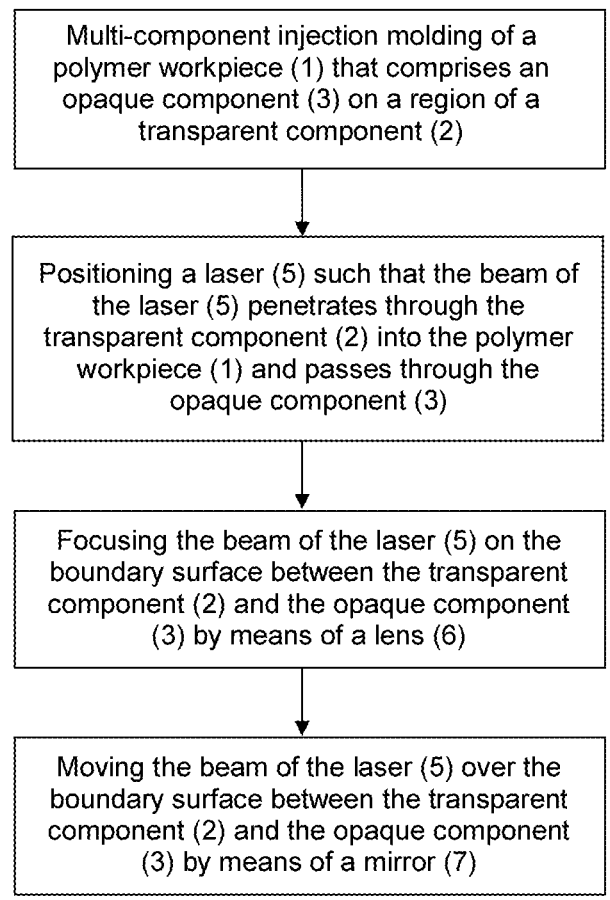

The invention is explained in detail with reference to drawings and exemplary embodiments. The drawings are schematic representations and not true to scale. The drawings in no way restrict the invention. They depict:

FIG. 1 a top plan view of one embodiment of the laser-marked polymer workpiece according to the invention, FIG. 2 a cross-section along A-A' through the laser-marked polymer workpiece according to the invention of FIG. 1, FIG. 2a an enlarged view of the detail Z of FIG. 2, FIG. 3 a cross-section along A-A' through the polymer workpiece according to the invention of FIG. 1 during the laser marking, FIG. 4 a detailed flow chart of the method according to the invention.

FIG. 1 and FIG. 2 each depict a detail of the polymer workpiece 1 according to the invention. It is a side window pane of a passenger car and has a height of 30 cm and a width of 28 cm. The polymer workpiece 1 contains a transparent component 2. An opaque component 3 with a width of 4 cm is arranged circumferentially on the transparent component 2 in the edge region of the polymer workpiece 1. FIG. 1 depicts the top plan view of the surface of the transparent component 2 turned away from the opaque component 3. The opaque component 3 can be discerned in the top plan view through the transparent component 2. The polymer workpiece 1 was produced by multi-component injection molding. The transparent component 2 has a thickness of 4 mm and contains polycarbonate (PC). The opaque component 3 has a thickness of 2 mm. The opaque component 3 contains a mineral-filled polycarbonate (PC)-polyethylene terephthalate (PET) mixture. The starting material for the injection molding of the opaque component 3 was prepared by the company Teijin Chemicals Ltd. (Panlite Y-0346 Color No. TG6654). The polymer workpiece 1 is not transparent in the region of the opaque component 3. The side window pane can thus be connected, for example, glued, to the vehicle body in a manner not visible to the observer, with the opaque component 3 preferably arranged facing the interior of the vehicle.

A mark 4 is arranged in at least one region of the opaque component 3. The mark 4 is introduced according to the invention into the opaque component 3 on the boundary surface between the transparent component 2 and the opaque component 3. The mark 4 is realized as a brightened region on the surface of the opaque component 3. The mark 4 is depicted for the sake of simplicity as a filled-in circle. In practice, the mark 4 can be, for example, a manufacturers symbol, a trademark symbol, a manufacturers code, a production date, and/or an approval mark.

By means of the arrangement according to the invention of the mark 4 in the interior of the polymer workpiece 1 on the boundary surface between the transparent component 2 and the opaque component 3, the mark 4 is advantageously protected against environmental influences, such as mechanical damage, for example. In addition, the mark 4 does not result in coating distribution problems, with the application of a coating (not shown) of the polymer workpiece 1, for example, a protective lacquer coating, after laser marking.

FIG. 2a depicts an enlarged view of the detail Z identified by a circle in FIG. 2. A region of the transparent component 2, a region of the opaque component 3 as well as the mark 4 introduced into the surface of the opaque component 3 facing the transparent component 2 can be seen.

FIG. 3 depicts a cross-section A-A' through the polymer workpiece of FIG. 1 during the laser marking according to the invention. The beam of the laser 5 enters the polymer workpiece 1 via the surface of the transparent component 2 facing away from the opaque component 3. The beam of a laser 5 is focused by means of a lens 6 on the boundary surface or interface between the transparent component 2 and the opaque component 3 of the polymer workpiece 1. The focal length of the lens 6 is 160 mm. The laser 5 is a diode-pumped fiber laser with a 2-m-long ytterbium-doped glass fiber as the active medium. The emission wavelength of the laser 5 is about 1063 nm. The laser 5 is operated in pulsed mode with a pulse duration of of 110 ns and a pulse frequency of 60 kHz. A mirror 7 is arranged in the beam path of the laser 5. By moving the mirror 7, the focus of the beam of the laser 5 can be moved over the boundary surface between the transparent component 2 and the opaque component 3 of the polymer workpiece 1.

The beam of the laser 5 results, already after an exposure time in the range of a few milliseconds, in a clear brightening on the surface of the opaque component 3. By means of the movement of the focused beam of the laser 5 over the boundary surface between the transparent component 2 and the opaque component 3 of the polymer workpiece 1, a mark 4, for example, a manufacturers symbol, a manufacturers code, a production date, or an approval mark, can thus be permanently applied.

FIG. 4 depicts, by way of example, the method according to the invention for producing a laser-marked polymer workpiece 1.

Test specimens of laser-marked polymer workpieces 1 according to the invention according to FIG. 1 were made with the method according to the invention. The laser marking was performed with the laser marking system DP20F of the company FOBA, comprising a laser 5, a mirror 7 and a lens 6. The mark 4 comprised letters, numbers, and geometric figures. With all test specimens, the mark 4 was clearly recognizable. The minimum line width of the mark 4 was roughly 0.1 mm.

It was unexpected and surprising for the person skilled in the art that a mark 4 of a polymer workpiece 1 can be provided in a simple and reliable manner without altering the surface of the polymer workpiece 1.

LIST OF REFERENCE CHARACTERS (1) polymer workpiece
(2) transparent component
(3) opaque component
(4) mark
(5) laser
(6) lens
(7) adjustable mirror
A-A' section line
Z detail of the polymer workpiece 1

The invention claimed is:

1. A method for producing a laser-marked polymer workpiece, comprising:

bonding a transparent component having a transmission in visible spectral range equal to or greater than 50% and an opaque component having a transmission in visible spectral range equal to or less than 20% via multi-component injection molding to form a polymer workpiece, the opaque component containing at least one colorant, and irradiating the opaque component through the transparent component with at least one laser thereby introducing a mark on a surface of the opaque component, wherein the mark is a brightening of the opaque component, wherein the opaque component is devoid of a laser sensitive additive, and wherein the at least one colorant comprises at least one black pigment.

2. The method according to claim 1, wherein the mark is introduced on the surface of the opaque component by a movement of a beam of the laser.

3. The method according to claim 1, wherein a beam of the laser is focused on a boundary surface between the transparent component and the opaque component.

4. The method according to claim 1, wherein an emission wavelength of the laser is from 600 nm to 3000 nm.

5. The method according to claim 1, wherein the laser is operated in pulsed mode and a pulse duration is from 5 ns to 300 ns, and a pulse repetition frequency is from 1 kHz to 500 kHz.

6. The method according to claim 1 wherein an output power of the laser is from 1 W to 50 W.

7. The method according to claim 2, wherein the beam of the laser is moved at a speed from 200 mm/s to 5000 mm/s.

8. The method according to claim 1, wherein an emission wavelength of the laser is from 900 nm to 1500 nm.

9. The method according to claim 1, wherein the laser is operated in pulsed mode and a pulse duration is from 5 ns to 300 ns, and a pulse repetition frequency is from 20 kHz to 150 kHz.

10. The method according to claim 1 wherein an output power of the laser is from 15 W to 35 W.

11. The method according to claim 1, wherein the black pigment comprises one or more of carbon black, aniline black, bone black, iron oxide black, spinel black, and graphite.

12. The method according to claim 1, wherein the workpiece comprises one or more of polycarbonate, polyethylene terephthalate, and polymethyl methacrylate.

* * * * *